H. A. DUC, Jr.
SELF ROTATING PROPELLER.
APPLICATION FILED DEC. 17, 1910.
1,099,083.
Patented June 2, 1914.
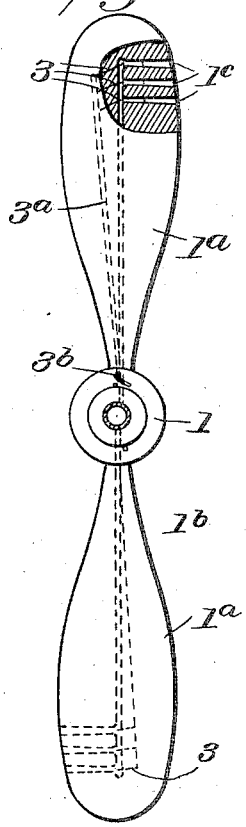
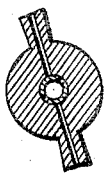
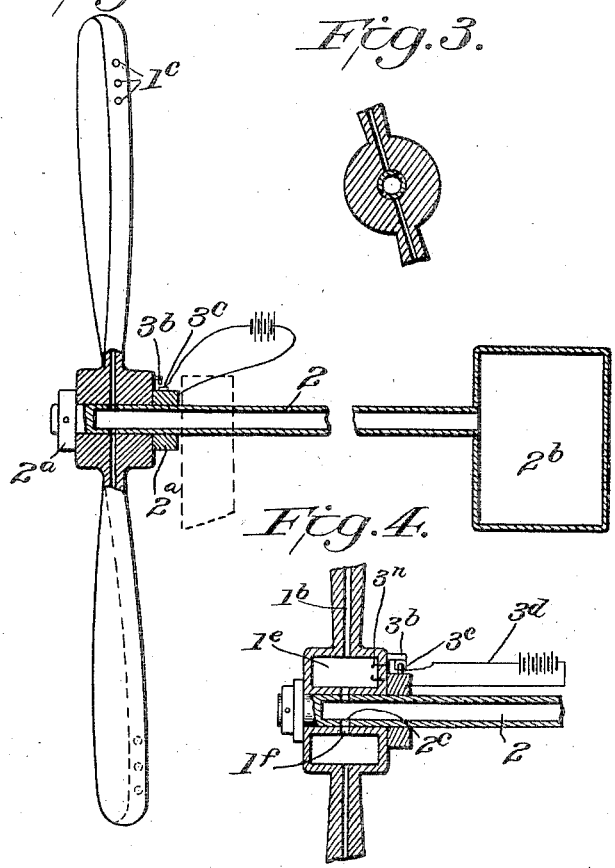
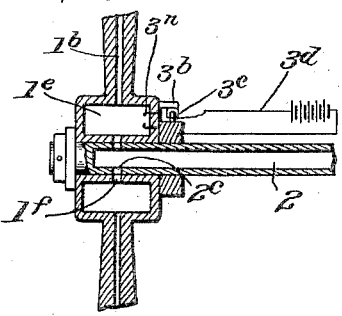
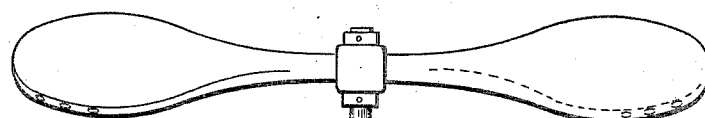
Witnesses
Inventor
Henry A. Duc, Jr.
By Alexander Powell
Attorneys

UNITED STATES PATENT OFFICE.

HENRY A. DUC, JR., OF CHARLESTON, SOUTH CAROLINA.

SELF-ROTATING PROPELLER.

1,099,083.

Specification of Letters Patent. Patented June 2, 1914.

Application filed December 17, 1910. Serial No. 597,886.

*To all whom it may concern:*

Be it known that I, HENRY A. DUC, Jr., of Charleston, in the county of Charleston and State of South Carolina, have invented certain new and useful Improvements in Self-Rotating Propellers; and I hereby declare that the following is a full, clear, and exact description thereof, reference being had to the accompanying drawings, which form part of this specification.

This invention is an improvement in what I call a combined propeller and engine, or engine-propeller, in that the engine and propeller are formed of one and the same parts and are inseparable.

The object of the invention is to produce a self-rotating propeller which may be used advantageously on air-ships, vessels, and for other purposes in the mechanical arts. The principal objects of the invention are to make an engine-propeller in which there will be the smallest possible amount of frictional surfaces; in which the abutments of the engine are also the propeller blades; in which the working chambers of the engine are within the propeller; and in which the reactive propulsive force of the impelling fluid or gas is exerted directly upon the propeller blades at the points where it will have the greatest efficiency in rotating the propeller upon its own axis.

The invention is particularly designed for use where high-speed high-power propellers are desired, and lightness, strength and simplicity of parts is essential; and the invention is particularly adapted for use for propelling aeroplanes, helicopters, and other types of aeronautical apparatus.

It may also be employed for marine propulsion and many other purposes in the art.

In the accompanying drawings I have illustrated in the simplest manner a self-contained engine-propeller and will explain the invention with reference to said drawings, sufficiently to enable any one skilled in the art to construct and use an apparatus embodying the invention.

In the drawings—Figure 1 is a front view of an engine-propeller partly in section. Fig. 2 is a side elevation thereof, partly in section. Fig. 3 is a detail section through the hub of the engine-propeller. Fig. 4 is a detail longitudinal section showing a modification thereof. Fig. 5 is a detail view indicating the application of such engine-propeller to an air-ship.

The engine-propeller in its simplest form resembles an ordinary two bladed propeller having a hub 1 and diametrically opposite blades $1^a$. The hub is rotatably journaled upon a shaft 2 fixedly mounted on any suitable supports, and the hub may be rotatably secured on said shaft between collars $2^a$ fast to the shaft. The shaft 2 is preferably made tubular, as shown, so that it can be used as the duct to supply the explosive or propelling fluid from a reservoir $2^b$ to the engine-propeller.

As shown, the shaft 2 is provided with ports $2^c$ which are adapted to communicate at certain times during the rotation of the engine-propeller with channels $1^b$ in the blades $1^a$, which channels extend outwardly through the blades and communicate near the outer ends thereof with one or a series of jet apertures $1^c$, which are arranged transversely of the blade and open out through the following edge of the blade;—that is in a direction contrary to the direction of movement of the blade. Preferably a plurality of jet apertures $1^c$ are employed.

I prefer to employ an explosive mixture or gas for driving the engine-propeller, such as petrol, or other suitable explosive, which can be supplied from the reservoir $2^b$ through the shaft 2 to the passages $1^b$, and pass therethrough to the apertures $1^c$; and may be ignited at the inner ends of the apertures $1^c$ by any suitable means; I have indicated in the drawings electrical igniting devices, comprising insulated sparking plugs 3 entering the inner ends of the jet apertures $1^c$ and connected by insulated wires $3^a$ with a brush $3^b$ attached to the hub 1; and said brush at the proper time during the rotation of the propeller (and when the ports $2^c$ are not in register with the passages $1^b$) contacts with an insulated contact $3^c$ which is connected to one terminal of a battery $3^d$ the other terminal of which may be connected to the metal frame of the engine, the parts being insulated in such manner that only when the brush $3^b$ engages contact $3^c$ will the electrical circuit be closed, and when the brush leaves the contact sparks are produced at the gap in the jet apertures which will ignite the explosive mixture in said jet apertures, and the resultant gases will be ejected from said apertures with such force that the reaction thereof will rotate the propeller.

Obviously by properly designing and proportioning the parts and using a suitable explosive fluid or mixture, a very high speed and high efficiency engine-propeller can be obtained; and there is practically no moving part except the propeller itself;—the shaft 2 being stationary and the propeller rotating upon said shaft. The only friction is that between the hub of the propeller and the shaft; this invention therefore presents the simplest possible type of engine-propeller, and as the reactive force of the propulsive gases is applied at or near the extremity of the blades where the greatest resistance is encountered, it is obvious that there is practically no torsional strain upon the propeller blades, and the blades drive the hub, instead of the hub driving the blades; and therefore the parts of the engine-propeller can be made much lighter than would be practical for an ordinary propeller.

As shown in Fig. 4 an explosive chamber $1^e$ may be formed in the hub of the engine-propeller, this chamber being connected by the passages $1^b$ with the jet apertures $1^c$, as in Fig. 1; and gas is admitted into this chamber $1^e$ through the ports $1^f$ in the hub which communicate with the ports $2^c$ in the shaft so that explosive mixture will be admitted intermittently into said chamber $1^e$ during the rotation of the engine-propeller. The gases in chamber $1^e$ may be exploded, after the ports $2^c$ are closed, by means of a sparking plug $3^n$, $3^k$,—the former of which is connected to the brush 3, and the latter electrically connected to the metal of the engine-propeller so that the circuit will be closed when the brush $3^b$ engages the contact $3^c$, as above described. In this case, after the ports $2^c$, $1^f$ are out of register, the spark ignites the explosive mixture in chamber $1^e$ and the resultant gases escape violently through the passages $1^b$ and jet apertures $1^c$. In this latter construction the gas jets would be of longer duration than they would be if exploded at the bases of the jet apertures $1^c$, as above described.

In Fig. 5 I have illustrated such an engine-propeller as used in a helicopter; in which case a large engine-propeller 1 can be mounted on a vertical shaft 2 to lift the frame 4, which may be of any suitable construction. As shown this shaft has a reservoir $2^b$ at base, secured to the frame 4 of the helicopter; I have simply indicated in Fig. 4 one practical use of the invention. The engine-propeller may also be used for driving a helicopter, or other aeroplane, horizontally and I have shown in Fig. 5 an engine-propeller $1^x$ mounted upon a horizontal shaft $2^x$, connected with the frame 4 and reservoir $2^b$, and which can be used to propel the machine horizontally through the air. While the invention is primarily designed for use with explosive mixtures the engine-propeller would be efficient if steam or compressed air were admitted through the shaft 2 to the propeller blades, the reaction of the steam or air jets causing the rotation of the engine-propeller. If used on vessels, water might be used as the actuating fluid and be forced under high pressure into and through the engine-propeller by any suitable pumping means.

By increasing the diameter and length of the hub of the propeller, any number of explosive chambers may be added, so that an increased or continuous pressure would be supplied if needed, and the passages through which all of the pressure escapes, may be gradually enlarged to reduce frictional retardation, due to higher velocity, from increased pressure, from multiplied explosions.

What I claim is:

1. In combination, a shaft provided with ports at one end, an engine-propeller rotatably mounted upon said shaft and having its blades provided with passages adapted to register with the ports in the shaft and jet apertures communicating with said passages and opening through the following edges of the blades near the outer ends thereof; with means for supplying explosive fluid through said shaft to said propeller, and means for igniting the explosive fluid in the propeller when the ports are closed.

2. An engine-propeller consisting of a hollow hub and propeller blades connected therewith, having jet apertures opening through the following edges of their blades near the outer ends thereof, and passages extending through the blades for conducting the gases from said hub to said jet apertures, and means for exploding gases in said hub whereby the blades are rotated by the reaction of the jets.

3. In combination, a shaft provided with ports at one end, an engine propeller rotatably mounted upon said shaft and having blades provided with passages adapted to register with the ports in the shaft, and jet apertures in the following edges of the blades communicating with said passages and means for exploding fluid in said passages, with means for supplying explosive gases to the jet apertures.

4. In combination, a shaft provided with ports at one end, an engine-propeller rotatably mounted upon said shaft and having blades provided with passages adapted to register with the ports in the shaft as the propeller rotates, and jet apertures communicating with said passages and opening through the following edges of the blades; with means for supplying explosive fluid through said shaft to said propeller, and means for igniting the explosive fluid in the propeller when the ports are closed.

In testimony that I claim the foregoing as my own, I affix my signature in presence of two witnesses.

HENRY A. DUC, Jr.

Witnesses:
JAMES R. MANSFIELD,
LILLIAN E. WITHAM.